(12) United States Patent
Thubert et al.

(10) Patent No.: US 10,750,495 B2
(45) Date of Patent: *Aug. 18, 2020

(54) INSERTION SLOTS ALONG DETERMINISTIC TRACK FOR MOVABLE NETWORK DEVICE IN A DETERMINISTIC NETWORK

(71) Applicant: Cisco Technology, Inc., San Jose, CA (US)

(72) Inventors: Pascal Thubert, La Colle sur Loup (FR); Patrick Wetterwald, Mouans Sartoux (FR); Jean-Philippe Vasseur, Anchorage, AK (US); Eric Michel Levy-Abegnoli, Valbonne (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/107,759

(22) Filed: Aug. 21, 2018

(65) Prior Publication Data

US 2019/0014575 A1  Jan. 10, 2019

Related U.S. Application Data

(63) Continuation of application No. 15/055,690, filed on Feb. 29, 2016, now Pat. No. 10,080,224.

(51) Int. Cl.
*H04W 4/00* (2018.01)
*H04W 72/04* (2009.01)
(Continued)

(52) U.S. Cl.
CPC ....... *H04W 72/0446* (2013.01); *H04W 84/22* (2013.01); *H04W 84/005* (2013.01)

(58) Field of Classification Search
CPC . H04W 16/18; H04W 74/04; H04W 74/0816; H04W 76/02; H04W 12/04;
(Continued)

(56) References Cited

U.S. PATENT DOCUMENTS

| 7,366,111 | B2 | 4/2008 | Thubert et al. |
| 7,593,377 | B2 | 9/2009 | Thubert et al. |

(Continued)

OTHER PUBLICATIONS

Weng et al., "6TiSCH Operation Sublayer (6top) Interface", [online], Jul. 6, 2015, [retrieved on Jan. 27, 2016]. Retrieved from the Internet: <URL: https://tools.ietf.org/pdf/draft-ietf-6tisch-6top-interface-04.pdf>, pp. 1-34.

(Continued)

*Primary Examiner* — Yemane Mesfin
*Assistant Examiner* — Mon Cheri S Davenport
(74) *Attorney, Agent, or Firm* — Leon R. Turkevich

(57) ABSTRACT

In one embodiment, a method comprises determining a movable network device is moving along a repeatable sequence of access point devices in a deterministic network; and establishing a deterministic track along the repeatable sequence of access point devices, the deterministic track comprising insertion slots allocated for insertion of a data packet, by the movable network device, into the deterministic track via any one of the respective access point devices.

18 Claims, 8 Drawing Sheets

(51) Int. Cl.
*H04W 84/22* (2009.01)
*H04W 84/00* (2009.01)

(58) Field of Classification Search
CPC ... H04W 88/08; H04W 88/085; H04W 40/20; H04W 72/0446; H04W 84/22; H04B 7/0697; H04B 7/024; H04J 3/0697; H04L 63/06; H04L 1/1812
See application file for complete search history.

(56) References Cited

U.S. PATENT DOCUMENTS

| | | |
|---|---|---|
| 7,885,274 B2 | 2/2011 | Thubert |
| 7,886,075 B2 | 2/2011 | Molteni et al. |
| 9,859,970 B2 | 1/2018 | Thubert et al. |
| 10,080,224 B2 * | 9/2018 | Thubert ............ H04W 72/0446 |
| 2003/0174664 A1 | 9/2003 | Benveniste |
| 2015/0078333 A1 | 3/2015 | Byers et al. |
| 2015/0124625 A1 | 5/2015 | Aldrin et al. |
| 2015/0327261 A1 | 11/2015 | Thubert et al. |
| 2016/0308793 A1 | 10/2016 | Levy-Abegnoli et al. |
| 2017/0223700 A1 | 8/2017 | Thubert et al. |
| 2017/0251468 A1 | 8/2017 | Thubert et al. |

OTHER PUBLICATIONS

Thubert, Ed., "An Architecture for IPv6 over the TSCH mode of IEEE 802.15.4", [online], Nov. 26, 2015, [retrieved on Jan. 27, 2016]. Retrieved from the Internet: <URL: https://tools.ietf.org/pdf/draft-ietf-6tisch-architecture-09.pdf>, pp. 1-47.

Sudhaakar et al., "6TiSCH Resource Management and Interaction using CoAP", [online], Mar. 9, 2015, [retrieved on Jan. 27, 2016]. Retrieved from the Internet: <URL: https://tools.ietf.org/pdf/draft-ietf-6tisch-coap-03.pdf>, pp. 1-16.

Vilajosana et al., "Minimal 6TiSCH Configuration", [online], Jan. 16, 2016, [retrieved on Jan. 27, 2016]. Retrieved from the Internet: <URL: https://tools.ietf.org/pdf/draft-ietf-6tisch-minimal-14.pdf>, pp. 1-28.

Palattella, et al., "Terminology in IPv6 over the TSCH mode of IEEE 802.15.4e", [online], Nov. 2, 2015, [retrieved on Jan. 27, 2016]. Retrieved from the Internet: <URL: https://tools.ietf.org/pdf/draft-ietf-6tisch-terminology-06.pdf>, pp. 1-14.

Winter, et al., "RPL: IPv6 Routing Protocol for Low-Power and Lossy Network", Internet Engineering Task (IETF), Request for Comments: 6550, Mar. 2012, pp. 1-157.

Watteyne, et al., "Using IEEE 802.15.4e Time-Slotted Channel Hopping (TSCH) in the Internet of Things (IoT): Problem Statement", Internet Engineering Task Force (IETF), Request for Comments: 7554, May 2015, pp. 1-23.

TTTECH, "Time-Triggered Ethernet—A Powerful Network Solution for Multiple Purpose", [online], [retrieved on Feb. 11, 2016]. Retrieved from the Internet: <URL: https://www.tttech.com/download/technologies/deterministic-ethernet/time-triggered-ethernet/?file=%2Ffileadmin%2Fcontent%2Fgeneral%2Fsecure%2FTTEthernet%2FTTTech_TTEthernet_Technical-Whitepaper.pdf&hash=0560afac568e8db0ee899519f1f95b4b&eID=fileDownload>, pp. 1-14.

Wikipedia, "Generalized Multi-Protocol Label Switching", [online], Aug. 18, 2014, [retrieved on Feb. 4, 2016]. Retrieved from the Internet: <URL: https://en.wikipedia.org/w/index.php?title=Generalized_Multi-Protocol_Label_Switching&printable=yes>, pp. 1-2.

Thubert et al., "IETF 6TSCH: Combining IPv6 Connectivity with Industrial Performance", 2013 Seventh International Conference on Innovative Mobile and Internet Services in Ubiquitous Computing, IEEE, Jul. 3, 2013, XP032485811, pp. 541-546.

Korbi et al., "Mobility Enhanced RPL for Wireless Sensor Networks", Network of the Future (NOF), 2012 Third International Conference on the, IEEE. Nov. 21, 2012, XP032332210, pp. 1-8.

Cobarzan et al., "Analysis and Performance Evaluation of RPL under Mobility", 2014 IEEE Symposium on Computers and Communications (ISCC), IEEE, Jun. 23, 2014, XP032649826, pp. 1-6.

\* cited by examiner

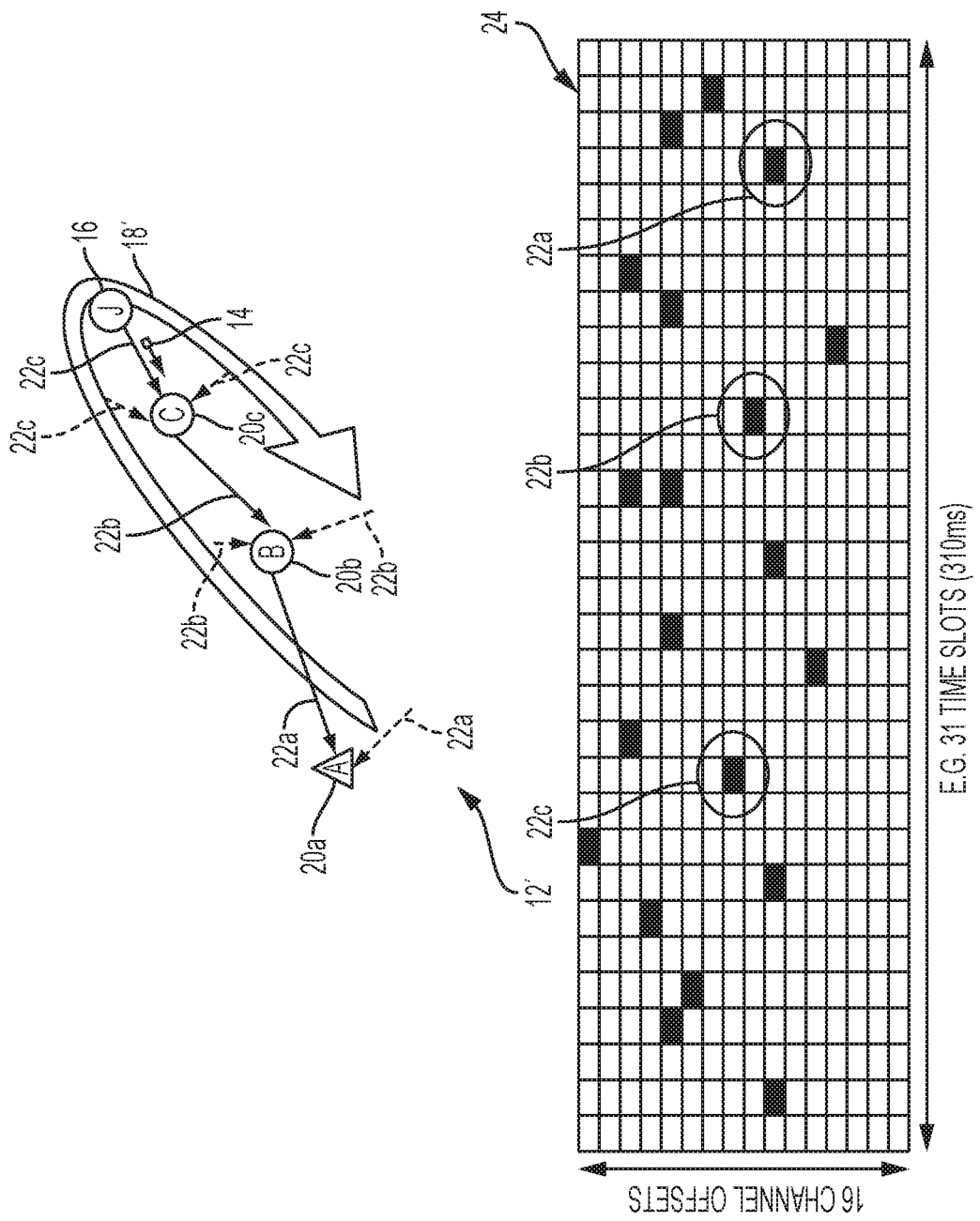

INSERTION SLOTS ALONG DETERMINISTIC TRACK FOR MOVABLE NETWORK DEVICE IN A DETERMINISTIC NETWORK

This application is a continuation of application Ser. No. 15/055,690, filed Feb. 29, 2016.

TECHNICAL FIELD

The present disclosure generally relates to generation of insertion slots along a deterministic track for a movable network device in a deterministic network.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

The Internet Engineering Task Force (IETF) is attempting to propose standards that can be applied to wireless devices for the stringent requirements of deterministic networks (e.g., minimal jitter, low latency, minimal packet loss). For example, Low power and Lossy Networks (LLNs) allow a large number (e.g., tens of thousands) of resource-constrained devices to be interconnected to form a wireless mesh network. The IETF has proposed a routing protocol ("6TiSCH") that provides IPv6 routing using time slotted channel hopping (TSCH) based on IEEE 802.15.4e, enabling LLN devices to use low-power operation and channel hopping for higher reliability. Routes can be based on the routing protocol for LLNs (RPL).

The 6TiSCH architecture specifies a Channel distribution/usage (CDU) matrix of "cells", each cell representing a unique wireless channel at a unique timeslot. The CDU is partitioned into prescribed "chunks", each chunk comprising multiple cells distributed in time and frequency (i.e., a different channel each timeslot). The 6TiSCH architecture specifies that a RPL parent device can allocate cells within an appropriated chunk to its first-hop child devices within its interference domain.

The 6TiSCH architecture also specifies that a central path computation element (PCE) can compute and install a track allocating a sequence of cells for each hop along a path from a source to a destination.

BRIEF DESCRIPTION OF THE DRAWINGS

Reference is made to the attached drawings, wherein elements having the same reference numeral designations represent like elements throughout and wherein:

FIGS. 6A, 6B, and 6C illustrate an example sequence of a movable network device establishing a deterministic track along the repeatable sequence of access point devices, based on successively obtaining insertion slots from each of the access point devices, according to an example embodiment.

DESCRIPTION OF EXAMPLE EMBODIMENTS

Overview

Figure 1:
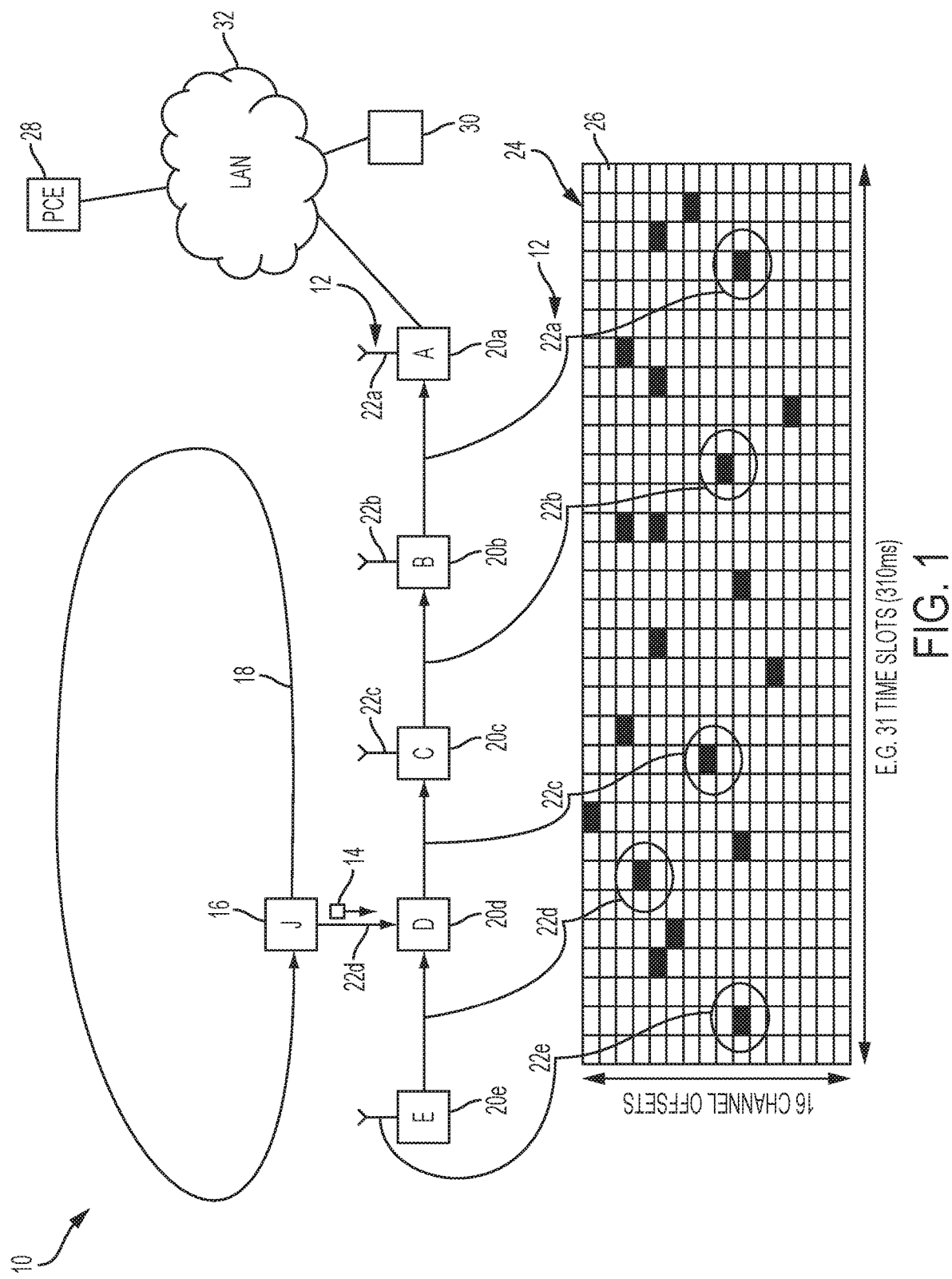
FIG. 1 illustrates an example system having an apparatus for establishing a deterministic track along a repeatable sequence of access point devices, with insertion slots for insertion of a data packet by a movable network device, according to an example embodiment.

In one embodiment, a method comprises determining a movable network device is moving along a repeatable sequence of access point devices in a deterministic network; and establishing a deterministic track along the repeatable sequence of access point devices, the deterministic track comprising insertion slots allocated for insertion of a data packet, by the movable network device, into the deterministic track via any one of the respective access point devices.

In another embodiment, an apparatus comprises a processor circuit and a device interface circuit. The processor circuit is configured for determining a movable network device is moving along a repeatable sequence of access point devices in a deterministic network. The processor circuit further is configured for establishing a deterministic track along the repeatable sequence of access point devices, the deterministic track comprising insertion slots allocated for insertion of a data packet by the movable network device into the deterministic track via any one of the respective access point devices. The device interface circuit configured for causing the movable network device to insert the data packet into the deterministic track based on any one of the insertion slots for the respective access point devices.

In another embodiment, one or more non-transitory tangible media is encoded with logic for execution by a machine and when executed by the machine operable for: determining a movable network device is moving along a repeatable sequence of access point devices in a deterministic network; and establishing a deterministic track along the repeatable sequence of access point devices, the deterministic track comprising insertion slots allocated for insertion of a data packet, by the movable network device, into the deterministic track via any one of the respective access point devices.

In another embodiment, a method comprises: a movable network device determining a nearest access point device as the movable network device moves along a repeatable sequence of access point devices of a deterministic network; the movable network device transmitting a data packet to the nearest access point device based on selecting an insertion slot associated with the nearest access point device, from among a plurality of insertion slots associated with the respective access point devices according to a deterministic track, for deterministic forwarding of the data packet within the sequence of access point devices.

In another embodiment, an apparatus comprises a processor circuit and a device interface circuit. The processor circuit is configured for determining a nearest access point device as the apparatus, implemented as a movable network device, moves along a repeatable sequence of access point devices of a deterministic network. The processor circuit further is configured for selecting an insertion slot associated with the nearest access point from among a plurality of insertion slots associated with the respective access point devices according to a deterministic track. The device interface circuit is configured for transmitting a data packet to the nearest access point device using the selected insertion slot, for deterministic forwarding of the data packet within the sequence of access point devices.

In another embodiment, one or more non-transitory tangible media is encoded with logic for execution by a machine and when executed by the machine operable for: the machine, implemented as a movable network device, determining a nearest access point device as the movable network device moves along a repeatable sequence of access point devices of a deterministic network; the movable network device transmitting a data packet to the nearest access point device based on selecting an insertion slot associated with the nearest access point device, from among a plurality of insertion slots associated with the respective access point devices according to a deterministic track, for deterministic forwarding of the data packet within the sequence of access point devices.

In another embodiment, a method comprises: an access point device in a deterministic network receiving identification of a first insertion slot allocated exclusively for transmission of a data packet originated by a movable network device to a successor access point device, the access point device and the successor access point device belonging to a repeatable sequence of access point devices followed by the movable network device as the movable network device moves in the deterministic network; the access point device identifying a second insertion slot allocated to the movable network device and preceding the first insertion slot; the access point device receiving, during the second insertion slot, a data packet originated by the movable network device; and the access point device deterministically forwarding the data packet, received during the second insertion slot, to the successor access point device at the first insertion slot, the second insertion slot preceding the first insertion slot being part of a deterministic track established for deterministic forwarding of the data packet along the sequence of access point devices.

In another embodiment, an apparatus comprises a device interface circuit and a processor circuit. The device interface circuit is configured for receiving, in a deterministic network, identification of a first insertion slot allocated exclusively for transmission of a data packet originated by a movable network device to a successor access point device. The apparatus implemented as an access point device in the deterministic network, the access point device and the successor access point device belonging to a repeatable sequence of access point devices followed by the movable network device as the movable network device moves in the deterministic network. The processor circuit is configured for identifying a second insertion slot allocated to the movable network device and preceding the first insertion slot. The device interface circuit is configured for receiving, during the second insertion slot, a data packet originated by the movable network device. The device interface circuit further is configured for deterministically forwarding the data packet, received during the second insertion slot, to the successor access point device at the first insertion slot, the second insertion slot preceding the first insertion slot being part of a deterministic track established for deterministic forwarding of the data packet along the sequence of access point devices.

In another embodiment, one or more non-transitory tangible media is encoded with logic for execution by a machine and when executed by the machine operable for: the machine, implemented as an access point device in a deterministic network, receiving identification of a first insertion slot allocated exclusively for transmission of a data packet originated by a movable network device to a successor access point device, the access point device and the successor access point device belonging to a repeatable sequence of access point devices followed by the movable network device as the movable network device moves in the deterministic network; the access point device identifying a second insertion slot allocated to the movable network device and preceding the first insertion slot; the access point device receiving, during the second insertion slot, a data packet originated by the movable network device; and the access point device deterministically forwarding the data packet, received during the second insertion slot, to the successor access point device at the first insertion slot, the second insertion slot preceding the first insertion slot being part of a deterministic track established for deterministic forwarding of the data packet along the sequence of access point devices.

DETAILED DESCRIPTION

FIG. 1 illustrates an example system 10 that enables establishment of a deterministic track 12 for deterministic forwarding of a data packet 14 originated by a movable wireless network device 16 that moves along a physical path 18 overlying a repeatable sequence of wireless access point devices 20, according to an example embodiment. The deterministic track 12 includes insertion slots 22 allocated for insertion of the data packet 14 into the deterministic track 12 via any one of the respective access point devices 20.

Conventional implementations of a deterministic track (e.g., Generalized Multi-protocol Label Switching (G-MPLS) according to the 6TiSCH architecture) in a deterministic network assume that a central path computation element (PCE) computes and installs the deterministic track along a fixed path of next-hop nodes between a fixed source device and a fixed destination device. In other words, the deterministic track is constructed based on the assumption that the source network device is fixed and does not move; hence, if a source network device is movable (e.g., a mobile node or mobile network device) and thus detaches from a first access point device and attaches to a second (different) access point device, the PCE would need to recalculate an updated deterministic track providing for the movable network device a deterministic path for reaching a destination device via the second access point device.

According to example embodiments, a deterministic track 12 is established based on the movable network device "J" 16 moving along a repeatable sequence of access point devices 20 in the deterministic network 10. The repeatable sequence (e.g., "E"-"D"-"C"-"B"-"A") enables each access point device (e.g., "D" 20d) in the repeatable sequence to have an associated insertion slot (e.g., 22d) reserved exclusively for transmission of a data packet 14, originated by the movable network device 16, to the corresponding access point device (e.g., "D" 20d). The insertion slot 22, also referred to as a "dual entry" insertion slot, enables the data packet 14 to be received by the access point device (e.g., "D" 20d) either from the movable network device 16, or from a successive next-hop second access point (e.g., "E" 20e) having received the data packet via its own corresponding "dual entry" insertion slot (e.g., 22e).

Hence, the concatenated sequence of "dual entry" insertion slots 22e, 22d, 22c, 22b, and 22a from the repeatable sequence of access point devices "E"-"D"-"C"-"B"-"A" establishes a deterministic track 12 that enables the movable network device 16 to insert the data packet 14 into any one of the access point devices "E", "D", "C", "B", or "A" 20 as the movable network device "J" 16 moves along the physical path 18. As illustrated in FIG. 1, each of the insertion slots 22a, 22b, 22c, 22d, and 22e are allocated from a CDU matrix 24 having a plurality of cells 26, each cell 26 representing a unique wireless channel at a unique timeslot. Hence, each insertion slot 22 corresponds to a unique cell 26. The CDU matrix 24 can be generated by a PCE 28. The repeatable CDU matrix 24 is illustrated as encompassing sixteen (16) frequency channel offsets over thirty-one (31) 10 millisecond (ms) timeslots, such that the CDU matrix 24 has a total duration of 310 ms.

Hence, the data packet 14 is propagated throughout the deterministic track 12 within a single instance of the repeatable CDU matrix 24, regardless of the access point device 20 that receives the data packet 14 from the movable network device "J" 16. As illustrated in FIG. 1, the repeatable sequence of access point devices "E"-"D"-"C"-"B"-"A" starts at a first end with a first (e.g., "A" 20a) of the access point devices, positioned as an origin of the repeatable sequence of access point devices: the first access point device "A" 20a is allocated the latest insertion slot 22a (in time) relative to the other access point devices 20b, 20c, 20d, and 20e successively following the first access point device "A" 20a in the repeatable sequence.

The term "successor" access point device refers to an access point device (e.g., "B" 20b) that is "ahead" of a second next-hop access point device (e.g., "C" 20c) that "successively follows" (i.e., succeeding) the successor access point device; in other words, an access point device (e.g., "C" 20c) receiving a data packet 14 will forward the data packet 14 to its successor access point device (e.g., "B" 20b) for deterministic propagation of the data packet toward its destination device 30. The deterministic track 12 is established based on the succeeding access point device (e.g., "C" 20c) having an insertion slot (e.g., 22c) that precedes in time the corresponding insertion slot (e.g., 22b) of its successor access point device (e.g., "B" 20b), enabling the successor access point device (e.g., "B" 20b) to receive the data packet from its succeeding next-hop neighbor (e.g., "C" 20c) before the insertion slot (e.g., 22b) of the successor access point device (e.g., "B" 20b).

As illustrated in FIG. 1 the access point device "B" 20b successively following the first access point device "A" 20a in the repeatable sequence is allocated an insertion slot 22b preceding the insertion slot 22a in the CDU matrix 24; in other words, the insertion slot 22b of the access point device "B" 20b precedes the insertion slot 22a of its successor access point device "A" 20a, enabling the first access point device "A" 20a to receive the data packet 14 during its insertion slot 22a from either the movable network device "J" 16 (if positioned near the access point device 20a) or its succeeding next-hop neighboring access point device "B" 20b that successively follows in the repeatable sequence. Similarly, the insertion slot 22c of the access point device "C" 20c precedes the insertion slot 22b of its successor access point device "B" 20b; the insertion slot 22d of the access point device "D" 20d precedes the insertion slot 22c of its successor access point device "C" 20c; and the insertion slot 22e of the access point device "E" 20d precedes the insertion slot 22d of its successor access point device "D" 20d.

Hence, each insertion slot 22 enables a corresponding access point device 20 to receive the data packet from any one of the movable network device "J" 16 or a succeeding access point of the repeatable sequence of access point devices. As illustrated in FIG. 1, and described in further detail below, the reception of the data packet 14 during the insertion slot 22d from the movable network device "J" 16 causes the access point device "D" 20d to forward the data packet 14 to its successor access point device "C" 20c at the insertion slot 22c; the reception of the data packet 14 during the insertion slot 22c from the access point device "D" 20d causes the access point device "C" 20c to forward the data packet 14 to its successor access point device "B" 20b at the insertion slot 22b; and the reception of the data packet 14 during the insertion slot 22b from the access point device "C" 20c causes the access point device "B" 20b to forward the data packet 14 to its successor access point device "A" 20a at the insertion slot 22a.

The deterministic track 12 established by the "dual-entry" insertion slots 22 enables the movable network device "J" 16 to transmit the data packet 14 to any one of the access point devices 20 in the repeatable sequence of access point devices "E"-"D"-"C"-"B"-"A", using the corresponding allocated insertion slot 22, based on the movable network device "J" 16 determining the nearest access point device 20 in the repeatable sequence.

As the movable network device "J" 16 moves along its physical path 18 (e.g., at an example speed of 1 meter/second), the movable network device "J" 16 can transmit a first data packet 14 to its nearest access point device "E" 20e at the insertion slot 22e, causing the data packet 14 to be propagated along the deterministic track 12 via the access point devices 20d, 20c, 20b, and 20a at insertion slots 22d, 22c, 22b, and 22a, respectively, within one instance of the CDU matrix 24: as described below, additional data packets 14 can be transmitted to the nearest access point device "E" 20e at the insertion slot 22e during a later instance of the repeating CDU 24.

As the movable network device "J" 16 moves along the physical path 18, the movable network device "J" 16 can transmit (during a subsequent instance of the CDU matrix 24) a second data packet 14 to its nearest access point device "D" 20d at the insertion slot 22d as illustrated in FIG. 1, causing the data packet 14 to propagated along the deterministic track 12 via the access point devices 20c, 20b, and 20a at insertion slots 22c, 22b, and 22a, respectively, within the one instance of the CDU matrix 24.

As the movable network device "J" 16 moves along the physical path 18, the movable network device "J" 16 can transmit (during a subsequent instance of the CDU matrix 24) a third data packet 14 to its nearest access point device "C" 20c at the insertion slot 22c, causing the data packet 14 to propagated along the deterministic track 12 via the access point devices 20b and 20a at insertion slots 22b and 22a, respectively, within the one instance of the CDU matrix 24.

As the movable network device "J" 16 moves along the physical path 18, the movable network device "J" 16 can transmit (during a subsequent instance of the CDU matrix 24) a fourth data packet 14 to its nearest access point device "B" 20b at the insertion slot 22b, causing the data packet 14 to propagated along the deterministic track 12 via the access point device 20a at insertion slot 22a. Similarly, if the movable network device "J" 16 moves along the physical path 18 such that the access point device "A" 20a is the nearest access point device, the movable network device "J" 16 can transmit (during a subsequent instance of the CDU matrix 24) a fifth data packet 14 to the first access point device "A" 20*a* using the insertion slot 22*a*.

Hence, each insertion slot 22 enables a corresponding access point device 20 to receive the data packet 14 from any one of the movable network device "J" 16 or a succeeding access point of the repeatable sequence of access point devices. Consequently, the deterministic track 12 comprising the insertion slots 22*a*, 22*b*, 22*c*, 22*d*, and 22*e* enable propagation of the data packet 14 from the movable network device 16 to the first access point device "A" 20*a*, via at least zero or more of the access point devices "B" 20*b*, "C" 20*c*, "D" 20*d*, and "E" 20*e* successively following the first access point device "A" 20*a* in the repeatable sequence, depending on the position of the movable network device "J" 16 in the physical path 18 that cause the movable network device "J" 16 to determine the nearest access point device 20.

The first access point device "A" 20*a*, in response to receiving the data packet 14, can forward the data packet 14 to a destination device 30 via a deterministic local area network (LAN) 32 using a second deterministic track (66 of FIG. 2) between the first access point device "A" 20*a* and the destination device 30.

Hence, the example embodiments can preserve deterministic forwarding of a data packet 14, despite movement of the originating movable network device "J" 16, without the necessity of recalculation of a new deterministic track by the PCE 28.

Figure 2:
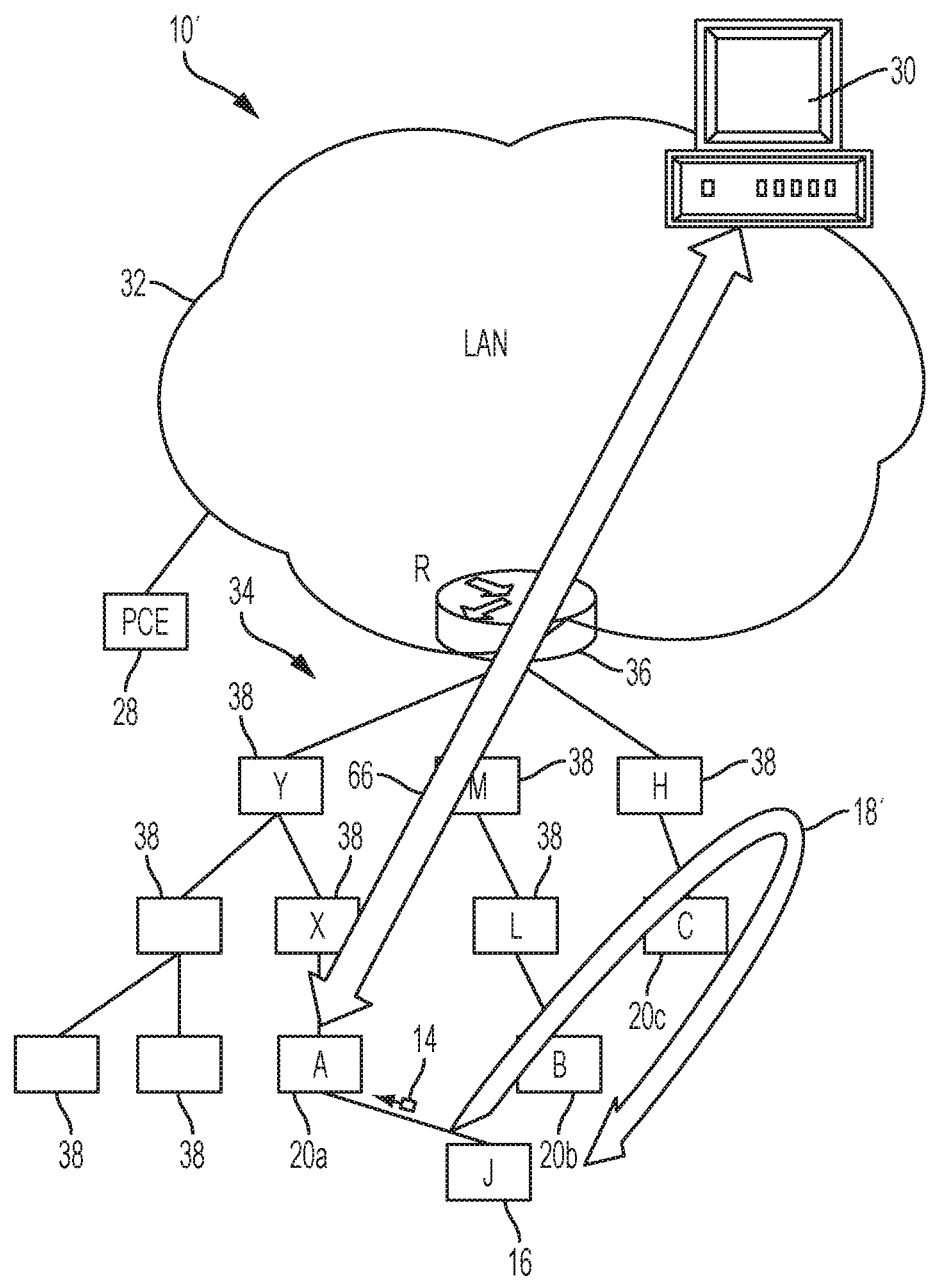
FIG. 2 illustrates another example system having one or more apparatus for establishing a deterministic track along a repeatable sequence of access point devices, with insertion slots for insertion of a data packet by a movable network device, according to an example embodiment.

FIG. 2 illustrates another example network 10' for establishing a deterministic track along a repeatable sequence of access point devices 20, with insertion slots for insertion of a data packet 14 by a movable network device "J" 16, according to an example embodiment. FIG. 2 illustrates that network 10' can include a wireless RPL network 34 comprising the access point devices "A" 20*a*, "B" 20*b*, and "C" 20*c*. The RPL network 34 also comprises a root network device "R" 36, and other RPL network devices 38. The access point device "A" 20*a* can reach the root network device "R" 36 (and the destination device 30) via the RPL network devices "X" and "Y" 38; the access point device "B" 20*b* can reach the root network device "R" 36 (and the destination device 30) via the RPL network devices "L" and "M" 38; and the access point device "C" 20*c* can reach the root network device "R" 36 (and the destination device 30) via the RPL network device "H" 38.

Hence, the movable network device "J" 16 in FIG. 2 can be a mobile network device moving along a repeatable physical path 18' within the RPL network 34, resulting in moving along the repeatable sequence of access point devices "A"-"B"-"C" in the RPL network 34.

As described in further detail below with respect to FIGS. 6A, 6B, and 6C, the movable network device "J" 16 is configured to establish the deterministic track (12' of FIG. 6C) based on requesting insertion slots 22 from the respective access point devices 20. In particular, the cells 26 in the CDU matrix 24 generated by the PCE 28 can be grouped into "chunks", where each chunk is exclusively allocated to a corresponding network device 20, 36, or 38 in the RPL network 34; hence, each access point device 20*a*, 20*b*, and 20*c* can allocate its own insertion slot 22 from its corresponding allocated chunk for use by the movable network device "J" 16 in transmitting a data packet 14 to the corresponding access point device 20.

According to an example embodiment, the movable network device "J" 16 can determine it is moving along a repeatable sequence of access point devices "A"-"B"-"C", and in response the movable network device "J" 16 can obtain respective insertion slots 22*a*, 22*b*, and 22*c* (in FIGS. 6A, 6B, and 6C) that enables formation of a deterministic track 12' along the repeatable sequence of access point devices "A"-"B"-"C". The movable network device "J" 16 can establish the deterministic track 12' based on requesting an insertion slot 22 that precedes a previously-received insertion slot 22 from a successor access point device 20. Hence, the movable network device "J" 16 can dynamically establish the deterministic track 12' based on requesting insertion slots 22 relative to the physical path 18', which can be detectable based on the movable network device J" 16 tracking the sequence of access point devices 20 detected by the movable network device "J" 16.

Figure 3:
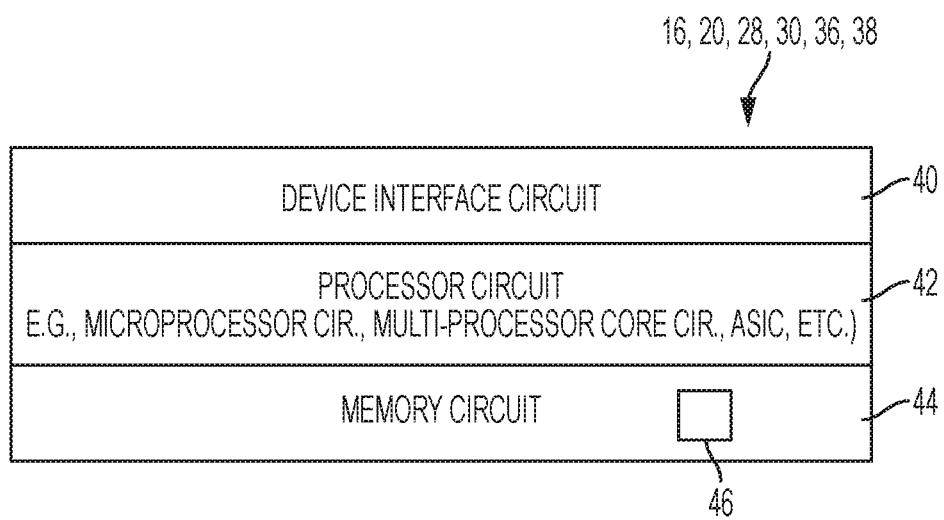
FIG. 3 illustrates an example implementation of any one of the devices of FIG. 1 or 2.

FIG. 3 illustrates an example implementation of any one of the devices 16, 20, 28, 30, 36, or 38, according to an example embodiment. Each device (i.e., apparatus) 16, 20, 28, 30, 36, or 38 is a physical machine (i.e., a hardware device) configured for implementing network communications with other physical machines via the deterministic network 10 or 10'. The term "configured for" or "configured to" as used herein with respect to a specified operation refers to a device and/or machine that is physically constructed and arranged to perform the specified operation.

Each apparatus 16, 20, 28, 30, 36, or 38 can include a device interface circuit 40, a processor circuit 42, and a memory circuit 44. The device interface circuit 40 can include one or more distinct physical layer transceivers for communication with any one of the other devices 16, 20, 28, 30, 36, or 38; the device interface circuit 40 also can include an IEEE based Ethernet transceiver for communications with the devices of FIG. 1 or 2 via any of the data links (e.g., a wired or wireless link, an optical link, etc.). The processor circuit 42 can be configured for executing any of the operations described herein, and the memory circuit 44 can be configured for storing any data or data packets as described herein, for example in a data structure 46.

Any of the disclosed circuits of the devices 16, 20, 28, 30, 36, or 38 (including the device interface circuit 40, the processor circuit 42, the memory circuit 44, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 44) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by the processor circuit. The memory circuit 44 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 44 can be implemented dynamically by the processor circuit 42, for example based on memory address assignment and partitioning executed by the processor circuit 42.

Figure 4:
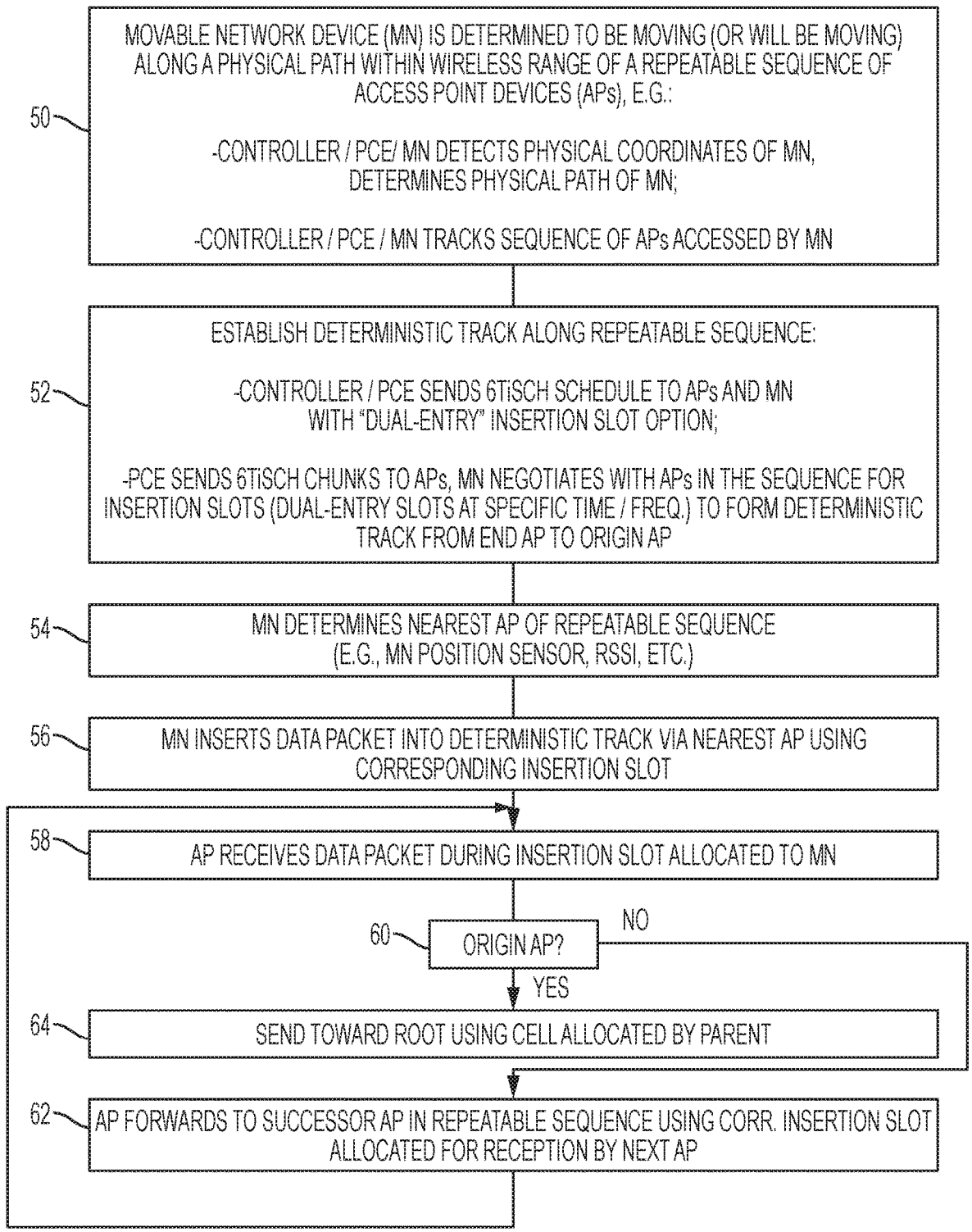
FIG. 4 illustrates an example method of establishing a deterministic track with insertion slots for insertion of a data packet, by a movable network device, along a repeatable sequence of access point devices, according to an example embodiment.

FIG. 4 illustrates an example method of establishing a deterministic track 12 with insertion slots 22 for insertion of a data packet 14, by a movable network device 16, along a repeatable sequence of access point devices 20, according to an example embodiment.

Figure 5:
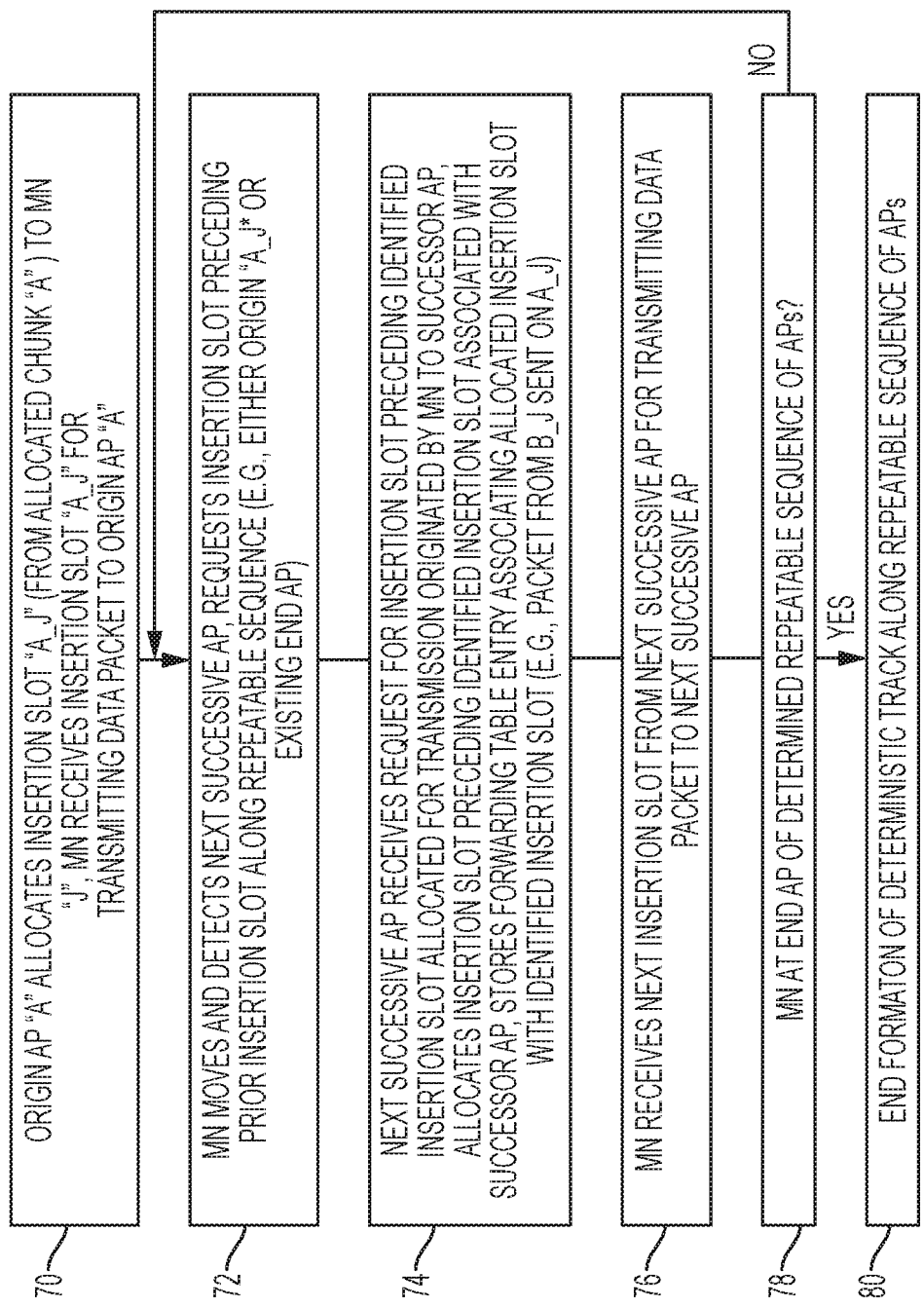
FIG. 5 illustrates in further detail an example method for establishing the deterministic track along a repeatable sequence of access point devices, with insertion slots for insertion of a data packet by a movable network device, according to an example embodiment.

FIG. 5 illustrates in further detail an example method for establishing the deterministic track 12 along a repeatable sequence of access point devices 20, with insertion slots 22 for insertion of a data packet 14 by a movable network device 16, according to an example embodiment.

Figure 6A:
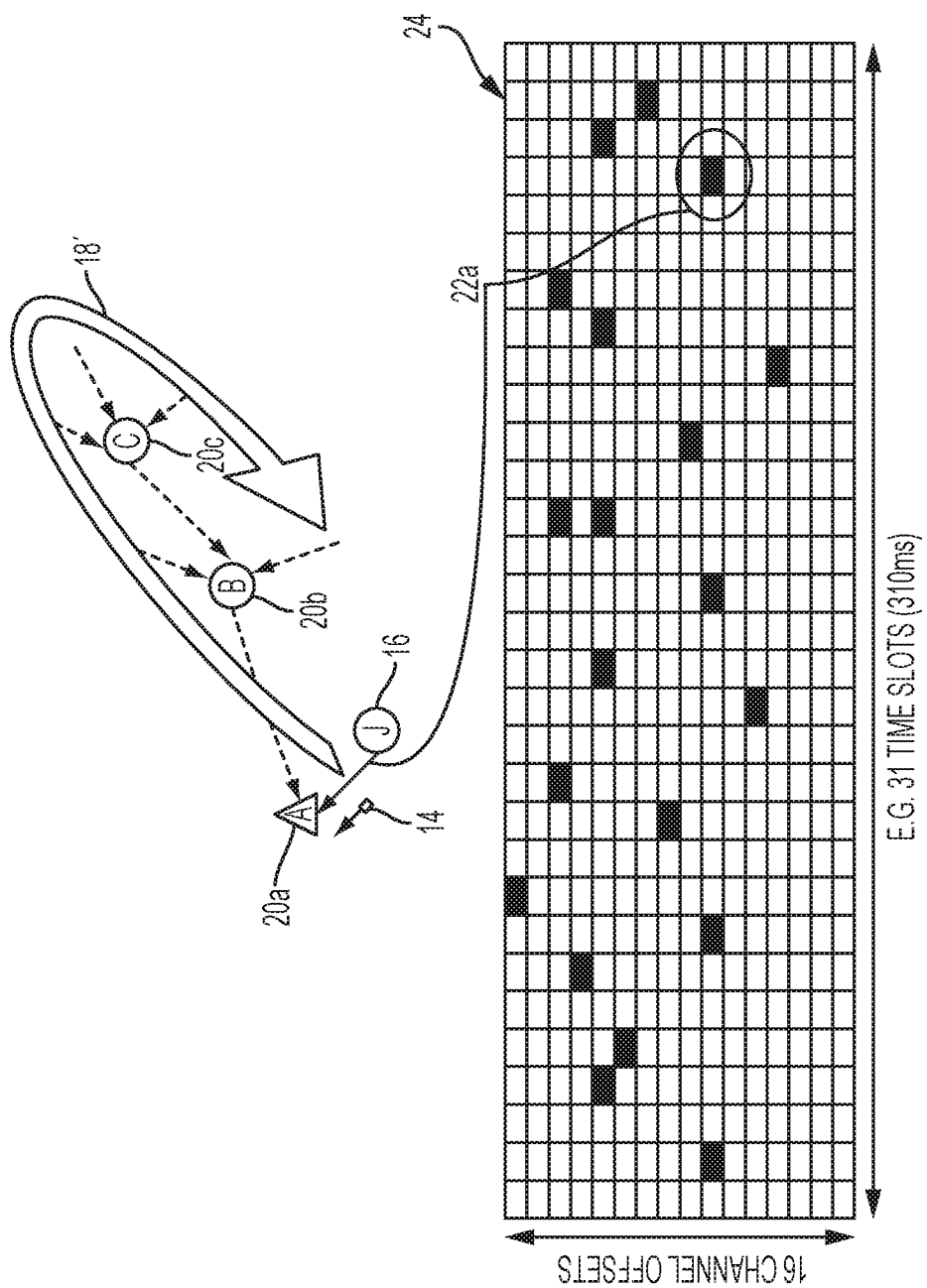
Figure 6B:
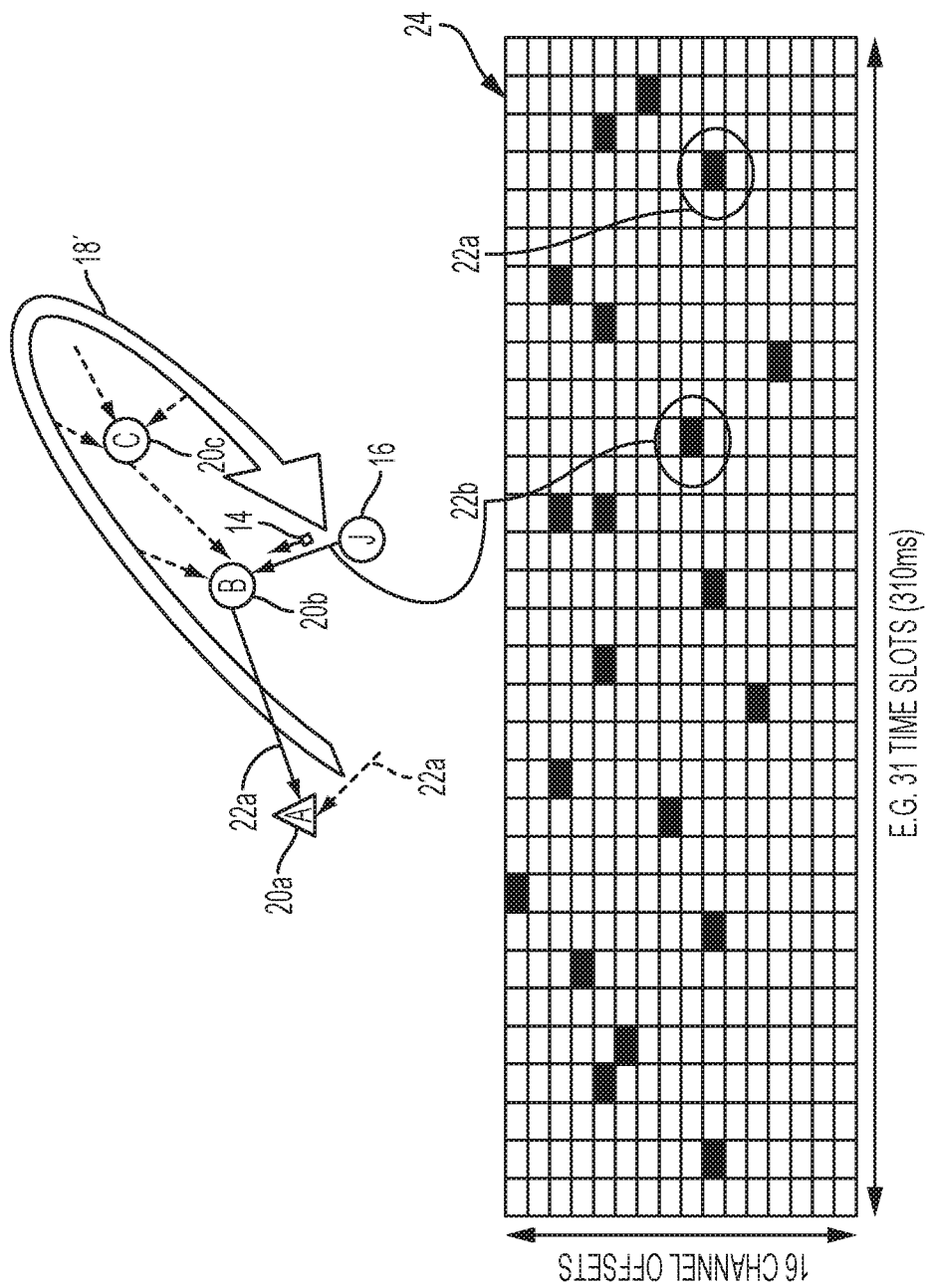

FIGS. 6A, 6B, and 6C illustrate an example sequence of a movable network device "J" 16 establishing a deterministic track (12' of FIG. 6C) along the repeatable sequence of access point devices 20, based on successively obtaining insertion slots 22 from each of the access point devices 20, according to an example embodiment.

The operations described with respect to any of the Figures can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.). Hence, one or more non-transitory tangible media can be encoded with logic for execution by a machine, and when executed by the machine operable for the operations described herein.

In addition, the operations described with respect to any of the Figures can be performed in any suitable order, or at least some of the operations in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or at least some of the operations in parallel.

Referring to FIG. 4, the processor circuit 42 of the PCE 28 and/or the movable network device "J" 16 in operation 50 can determine that the movable network device "J" 16 is moving (or will be moving) along a repeatable sequence of access point devices 20 in the deterministic network 10. For example, the processor circuit 42 of the PCE 28 can be configured for determining that the physical path 18 is within wireless range of a repeatable sequence of access point devices 20, based on detecting that the movable network device "J" 16 is following a physical path 18: in one example, the movable network device "J" 16 can be mounted on a trolley that moves along a track mounted on a boom (jib) of a "hammerhead" tower crane at a construction site; hence the PCE 28 can preprogram the movable network device "J" 16 and each of the access point devices 20 with the associated insertion slots 22 based on the physical path 18 traversed by the movable network device "J" 16 as the trolley moves along the track of the boom on the tower crane, and the processor circuit 42 of the movable network device "J" 16 can detect the nearest access point device 20 based on linear sensors (and/or GPS sensors) detecting the position of the movable network device "J" 16 on the physical path 18.

In another example of the movable network device "J" 16 implemented for example as part of an unmanned aerial vehicle (UAV) such as a quadcopter, the processor circuit 42 of the PCE 28 and/or the movable network device "J" 16 in operation 50 can determine the physical path 18 based on a prescribed flight path for the movable network device "J" 16 stored in the data structure 46 of the movable network device "J" 16, and/or based solely on tracking a detected telemetry (e.g., GPS tracks) generated by inertial or GPS sensors on the UAV that optionally can be stored locally in the data structure 46 and/or transmitted to the PCE 28 via the nearest access point device 20 (e.g., using a cell 26 allocated by the nearest access point device 20 for initial/ad hoc communications with the PCE 28).

The processor circuit 42 of the movable network device "J" 16 and/or the PCE 28 in operation 50 also can determine that the movable network device "J" 16 is moving along a repeatable sequence of access point devices 20 based on detecting and tracking the sequence that the movable network device "J" 16 attaches to the access point devices 20. Hence, the repeatable sequence of access point devices 20 can be tracked and determined without detection of the physical path 18 or correlation of the physical path 18 to the nearest access point devices 20 along the physical path 18.

The processor circuit 42 of the movable network device "J" 16 and/or the PCE 28 in operation 52 can establish the deterministic track 12 along the repeatable sequence of access point devices 20, where the deterministic track 12 comprises the insertion slots 22 that enable the movable network device "J" 16 to insert a data packet 14 into the deterministic track 12 (or 12' of FIG. 6C) via any one of the respective access point devices 20. For example, the PCE 28 can send a 6TiSCH schedule to the access point devices 20 and the movable network device "J" 16, optionally with a "dual-entry" insertion slot option. Hence, the movable network device "J" 16 can obtain from the PCE 28 each of the insertion slots 22 for transmitting the data packet 14 into the deterministic track 12 via any one of the access point devices 20. Similarly, each of the access point devices 20 along the repeatable sequence (e.g., "E"-"D"-"C"-"B"-"A" of FIG. 1 or "A"-"B"-"C" of FIGS. 6A-6C) can be preprogrammed with the corresponding insertion slot 22 allocated exclusively for reception of the data packet 14 originated by the movable network device "J" 16, enabling each access point device 20 to identify the corresponding insertion slot 22 allocated exclusively for reception of the data packet 14; at least the succeeding access point devices 20 (e.g., "E"-"D"-"C"-"B" in FIG. 1 or "B"-"C" in FIGS. 6A-6C) succeeding the origin access point device "A" 20a also can receive an identification of the second corresponding insertion slot 22 reserved exclusively for transmitting the data packet 14 to its successor access point device 20.

Hence, reception of the first and second insertion slots 22 from the PCE 28 enables each access point device 20 to deterministically receive the data packet 14 from either the movable network device "J" 16 or a succeeding access point device 20 using its first corresponding insertion slot 22, and deterministically forward the data packet 14 to its corresponding successor access point device 20 using the second corresponding insertion slot 22. Any one of the access point devices 20 also can be implemented as a switching device providing the necessary timing and/or synchronization intervals to received and/or transmitted data packets as described with respect to the insertion slots.

As described in further detail below with respect to FIG. 5 and FIGS. 6A-6C, the processor circuit 42 of the movable network device "J" 16 in operation 52 also can establish the deterministic track 12' dynamically with the access point devices 20 based on the processor circuit 42 of the movable network device "J" 16 dynamically requesting the insertion slots 22 from the respective access point device 20 as the movable network device "J" 16 moves along its physical path 18'. As described previously, each access point device 20 can acquire from the PCE 28 a corresponding unique chunk comprising a plurality of unique cells 26; hence, the processor circuit 42 of each access point device 20 can respond to the corresponding request from the movable network device "J" 16 by allocating an insertion slot 22 (associated with a corresponding cell 26) from its corresponding chunk having been acquired from the PCE 28.

The processor circuit 42 of the movable network device "J" 16 in operation 54 determines the nearest access point device 20 as the movable network device "J" 16 moves along the repeatable sequence of access point devices 20, for example based on a position sensor locally associated with the movable network device "J" 16 relative to stored identification of the access point devices 20 along the physical path 18, a comparison of received signal strength indicators (RSSIs) between two adjacent access point devices 20 providing overlapping wireless propagation areas, etc. In response to the processor circuit 42 of the movable network device "J" 16 determining the closest access point device (e.g., 20b), the processor circuit 42 of the movable network device "J" 16 in operation 56 causes the device interface circuit 40 to transmit the data packet 14 to the nearest access point device 20 based on selecting the insertion slot (e.g., 22b) associated with the nearest access point device (e.g., 20b) from among the insertion slots 22 associated with the respective access point devices 20 of the physical path 18 or 18'.

The device interface circuit 40 of the nearest access point device (e.g., 20b) in operation 58 receives the data packet 14 from the movable network device "J" 16 during the insertion slot (e.g., 22b) allocated for transmission to the access device (e.g., 20b) from the movable network device "J" 16 (or a succeeding access point device 20c, described below). If in operation 60 the access point device (e.g., 20b) is not an origin access point "A" as described above (i.e., the first access point at the end of the deterministic track 12 or 12'), the processor circuit 42 of the succeeding access point device (e.g., 20b) accesses its forwarding table in the data structure 46 stored in the memory circuit 44 to determine that the data packet 14 received on the receiving insertion slot (e.g., 22b) is to be transmitted to its successor access point device (e.g., 20a) on the transmitting insertion slot (e.g., 22a). Hence, each succeeding access point device 20 can include one or more table entries in its corresponding data structure 46 specifying at least a transmitting insertion slot for each receiving insertion slot 22 for a given deterministic track 12 or 12'.

Hence, the succeeding access point device (e.g., 20b) in operation 62 deterministically forwards the data packet 14, received during the insertion slot 22b, to its successor access point device (e.g., 20a) at the corresponding transmitting insertion slot (e.g., 22a), enabling deterministic transmission of the data packet 14 along the deterministic track 12 or 12'. As apparent from FIG. 4, operations 58 and 62 can be executed by each access point device 20 along the repeatable sequence of access point devices 20 until the data packet 14 reaches the origin access point device "A" 20a.

In response to the access point device 20a receiving the data packet 14 at the insertion slot 22a in operation 58, the processor circuit 42 of the access point device 20a can determine that it is the origin access point for the deterministic track 12, and in response forward in operation 64 the data packet 14 to the destination (e.g., 30 of FIG. 2 via the root network device "R" 36) using a cell 26 having been allocated by a parent network device (e.g., "X" 38 of FIG. 2) providing reachability to the access point device 20a. As described previously, the access point device 20a (and network devices "X" 38, "Y" 38, and "R" 36 of FIG. 2) can be part of a second deterministic track 66 allocated by the PCE 28.

Hence, the example embodiments enable a deterministic track 12 or 12' to be established along the repeatable sequence of access point devices 20, where the deterministic track 12 includes insertion slots 22 allocated for insertion of a data packet 14, by the movable network device "J" 16, into the deterministic track 12 via any one of the access point devices 20. Each insertion slot 22 enables a corresponding access point device 20 to receive the data packet 14 from either the movable network device "J" 16 or a succeeding access point 20 in the repeatable sequence. The deterministic track 12 or 12' is within a single instance of the repeating cell 26, enabling propagation of the data packet 14 from the movable network device "J" 16 to the origin access point device "A" 20a via at least zero or more of the access point devices "B" 20b, "C" 20c, etc., successively following the origin access point device "A" 20a in the repeatable sequence.

Hence, the example embodiments enable deterministic forwarding of the data packet 14 in the deterministic network 10, even though the movable network device "J" 16 moves among different access point devices 20, based on the establishment of the deterministic track 12.

FIG. 5 illustrates in further detail the movable network device "J" 16 establishing the deterministic track 12' of FIGS. 6A, 6B, and 6C (summarized in operation 52 of FIG. 4), according to an example embodiment. The operations of FIG. 5 also can be applied to establishing the deterministic track 12 in the example of FIG. 1 if the direction of physical path 18 was reversed to match the physical path 18' of FIGS. 6A-6C, in other words the movable network device "J" 16 started with the origin access point device "A" 20a and successively established wireless connections with the sequence of access point devices "B" 20b, "C" 20c, "D" 20d, and "E" 20e.

Referring to operation 70, the processor circuit 42 of the movable network device "J" 16 can request an insertion slot 22 from the origin access point device "A" 20a, causing the processor circuit 42 of the origin access point device "A" 20a to allocate the first insertion slot "A_J" 22a to the movable network device "J" 16 as illustrated in FIG. 6A. As described previously, the origin access point device "A" 20a can allocate the first insertion slot "A_J" 22a from a chunk "A" having been allocated to the origin access point device "A" 20a. Hence, the movable network device "J" 16 can transmit a data packet 14 to the origin access point device "A" 20a using first insertion slot "A_J" 22a, illustrated in FIG. 6A by the solid arrow between the movable network device "J" 16 and the origin access point device "A" 20a (dashed lines refer to unused links in the deterministic track 12 for the specific instance of the CDU matrix 24).

The movable network device "J" 16 in operation 72 moves along the physical path 18' and detects the second access point device "B" 20b succeeding the origin access point device "A" 20a. In response to detecting the second access point device "B" 20b, the processor circuit 42 of the movable network device "J" 16 is configured for requesting in operation 72 an insertion slot 22 that precedes the insertion slot "A_J" 22a; for example, the request sent by the movable network device "J" 16 to the access point device 20b can specify the insertion slot "A_J" 22a received from the successor access point device "A" 20a.

In response to the second access point device "B" 20b in operation 74 receiving the request for an insertion slot 22 that precedes the insertion slot "A_J" 22a, the second access point device "B" 20b can identify that the insertion slot "A_J" 22a is allocated exclusively for transmitting any data packet 14 originated by the movable network device "J" 16 to the successor access point device "A" 20a. Hence, the second access point device "B" 20b can respond to the request by allocating (from its allocated chunk "B") a second insertion slot "B_J" 22b that precedes the insertion slot "A_J" 22a, and creating a table entry in its data structure 46 that associates the second insertion slot "B_J" 22b with the first insertion slot "A_J" 22a.

The movable network device "J" 16 receives in operation 76 the second insertion slot "B_J" 22b for transmitting a data packet 14 to the next successive access point device "B" 20b. Hence, as illustrated in FIG. 6B by the solid arrows, any data packet 14 received by the second access point device "B" 20b on the second insertion slot "B_J" 22b is forwarded by the second access point "B" 20b to the origin access point device "A" 20a using the first insertion slot "A_J" 22a (illustrated in FIG. 6B). If in operation 78 the movable network device "J" 16 determines it is not at the end of the determined repeatable sequence of access point devices 20, the movable network device "J" 16 can continue adding insertion slots 22 from successive access point devices (e.g., "C" 20c) until the deterministic track 12 along the entire sequence of access point devices 20 has been completed in operation 80.

As illustrated in FIG. 6C, operations 72, 75, and 76 can be completed for the next successive access point device "C" 20c based on the movable network device "J" 16 in operation 62 requesting an insertion slot 22 that precedes the second insertion slot "B_J" 22b. The successive access point device "C" 20c in operation 74 can respond to the received request by allocating to the movable network device "J" 16 a third insertion slot "C_J" 22c that precedes the second insertion slot "B_J" 22b, and storing a forwarding table entry in the data structure 46 specifying that any data packet 14 received by the access point device "C" 20c on the third insertion slot "C_J" 22c is forwarded on the second insertion slot "B_J" 22b to its successor access point device "B" 20b.

Hence, the movable network device "J" 16 is able to establish the deterministic track 12' comprising the insertion slots "C_J" 22c, "B_J" 22b, and the "A_J" 22a, enabling the device interface circuit 40 of the movable network device "J" 16 to transmit the data packet 14 to the nearest access point device 20 using the corresponding selected insertion slot 22, for deterministic forwarding of the data packet 14 within the sequence of access point devices 20 via the deterministic track 12'. Further, the movable network device "J" 16 is able to identify to each successive access point device (e.g., "B" 20b or "C" 20c) the insertion slot (e.g., "A_J" 22a or "B_J" 22b) of the corresponding successor access point device (e.g., "A" 20a or "B" 20b), enabling the corresponding successive access point device (e.g., "B" 20b or "C" 20c) to deterministically forward the data packet 14 to its successor access point device (e.g., "A" 20a or "B" 20b), without the necessity of additional allocation of any insertion slot 22 by the successor access point device. In other words, the successive access point device (e.g., "B" 20b or "C" 20c) acts as a "proxy" in transmitting the data packet 14 on behalf of the movable network device "J" 16 during the insertion slot (e.g., "A_J" 22a or "B_J" 22b) associated with the corresponding successor access point device (e.g., "A" 20a or "B" 20b).

Also note with respect that the physical path 18' of FIGS. 6A, 6B, and 6C illustrate that the repeatable sequence of access point devices 20 can be applied in a "circular" pattern (e.g., "A"-"B"-"C"-"B"-"A", etc.), hence, FIG. 6C illustrates that the movable network device "J" 16 has a transmit opportunity on the insertion slot "B_J" 22b on the "outward" trajectory (i.e., moving away from the origin access point device "A" 20a and toward the access point device "C" 20c) and another transmit opportunity on the insertion slot "B_J" 22b on the "inward" or "return" trajectory (i.e., moving toward the origin access point device "A" 20a and away from the access point device "C" 20c) of the physical path 18. As illustrated in FIG. 6C, the movable network device "J" 16 can have multiple (e.g., three or more) transmit opportunities on any given insertion slot (e.g., 22c) over multiple instances of the CDU matrix 24, since the duration of communications with a given access point device 20 can span multiple instances of the CDU matrix 24 due to the relative speed of the movable network device "J" 16 on the physical path 18 relative to the duration of the repeatable CDU matrix 24.

According to example embodiments, a deterministic track can be established for a movable network device that enables deterministic forwarding of data packets as the movable network device moves throughout a deterministic network, eliminating any need for recalculating replacement deterministic tracks or topology updates due to the movable network device detaching from an existing access point device and attaching to different access point devices. The deterministic track can be appended to another deterministic track that terminates at an origin access point of the movable network device, enabling the movable network device to maintain deterministic transmission of data packets as it moves throughout the deterministic network.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
an access point device in a deterministic network receiving identification of a first insertion slot allocated exclusively for transmission of a data packet originated by a movable network device to a successor access point device, the access point device and the successor access point device belonging to a repeatable sequence of access point devices followed by the movable network device as the movable network device moves in the deterministic network;
the access point device identifying a second insertion slot allocated to the movable network device and preceding the first insertion slot;
the access point device receiving, during the second insertion slot, a data packet originated by the movable network device; and
the access point device deterministically forwarding the data packet, received during the second insertion slot, to the successor access point device at the first insertion slot, the second insertion slot preceding the first insertion slot being part of a deterministic track established for deterministic forwarding of the data packet along the sequence of access point devices.

2. The method of claim 1, wherein:
the second insertion slot is a dual entry slot that enables the access point device to receive the data packet from any one of movable network device or a succeeding access point device belonging to the repeatable sequence;
the first insertion slot a dual entry slot that enables the access point device to deterministically forward the data packet to the successor access point device without allocation of the first insertion slot by the successor access point device or any path computation element to the access point device.

3. The method of claim 1, wherein each insertion slot corresponds to a unique transmission channel at a unique timeslot.

4. The method of claim 3, wherein the receiving identification of the first insertion slot includes the access point device receiving an allocated chunk comprising a plurality of unique cells associated with transmission of a data packet.

5. The method of claim 1, wherein:
the receiving identification of the first insertion slot includes the access point device receiving, from the movable network device, a request for an insertion slot preceding the first insertion slot specified in the request;
the method further comprising the access point device creating a table entry associating the second insertion slot with the first insertion slot, and responding to the request with identification of the second insertion slot.

6. The method of claim 1, wherein the access point device and the successor access point device are attached to distinct parent network devices in a tree-based topology.

7. An apparatus comprising:
a device interface circuit configured for receiving, in a deterministic network, identification of a first insertion slot allocated exclusively for transmission of a data packet originated by a movable network device to a successor access point device, the apparatus implemented as an access point device in the deterministic network, the access point device and the successor access point device belonging to a repeatable sequence of access point devices followed by the movable network device as the movable network device moves in the deterministic network; and
a processor circuit configured for identifying a second insertion slot allocated to the movable network device and preceding the first insertion slot;
the device interface circuit configured for receiving, during the second insertion slot, a data packet originated by the movable network device;
the device interface circuit configured for deterministically forwarding the data packet, received during the second insertion slot, to the successor access point device at the first insertion slot, the second insertion slot preceding the first insertion slot being part of a deterministic track established for deterministic forwarding of the data packet along the sequence of access point devices.

8. The apparatus of claim 7, wherein the second insertion slot is a dual entry slot that enables the access point device to receive the data packet from any one of movable network device or a succeeding access point device belonging to the repeatable sequence;
the first insertion slot a dual entry slot that enables the access point device to deterministically forward the data packet to the successor access point device without allocation of the first insertion slot by the successor access point device or any path computation element to the access point device.

9. The apparatus of claim 7, wherein each insertion slot corresponds to a unique transmission channel at a unique timeslot.

10. The apparatus of claim 9, wherein the device interface circuit is configured for receiving identification of the first insertion slot in an allocated chunk comprising a plurality of unique cells associated with transmission of a data packet.

11. The apparatus of claim 7, wherein:
the device interface circuit is configured for receiving, from the movable network device, a request for an insertion slot preceding the first insertion slot specified in the request;
the processor circuit configured for creating a table entry associating the second insertion slot with the first insertion slot, and responding to the request with identification of the second insertion slot.

12. The apparatus of claim 7, wherein the apparatus and the successor access point device are attached to distinct parent network devices in a tree-based topology.

13. One or more non-transitory tangible media encoded with logic for execution by a machine and when executed by the machine operable for:
the machine, implemented as an access point device in a deterministic network, receiving identification of a first insertion slot allocated exclusively for transmission of a data packet originated by a movable network device to a successor access point device, the access point device and the successor access point device belonging to a repeatable sequence of access point devices followed by the movable network device as the movable network device moves in the deterministic network;
the access point device identifying a second insertion slot allocated to the movable network device and preceding the first insertion slot;
the access point device receiving, during the second insertion slot, a data packet originated by the movable network device; and
the access point device deterministically forwarding the data packet, received during the second insertion slot, to the successor access point device at the first insertion slot, the second insertion slot preceding the first insertion slot being part of a deterministic track established for deterministic forwarding of the data packet along the sequence of access point devices.

14. The one or more non-transitory tangible media of claim 13, wherein:
the second insertion slot is a dual entry slot that enables the access point device to receive the data packet from any one of movable network device or a succeeding access point device belonging to the repeatable sequence;
the first insertion slot a dual entry slot that enables the access point device to deterministically forward the data packet to the successor access point device without allocation of the first insertion slot by the successor access point device or any path computation element to the access point device.

15. The one or more non-transitory tangible media of claim 13, wherein each insertion slot corresponds to a unique transmission channel at a unique timeslot.

16. The one or more non-transitory tangible media of claim 15, wherein the receiving identification of the first insertion slot includes the access point device receiving an allocated chunk comprising a plurality of unique cells associated with transmission of a data packet.

17. The one or more non-transitory tangible media of claim 13, wherein:
the receiving identification of the first insertion slot includes the access point device receiving, from the movable network device, a request for an insertion slot preceding the first insertion slot specified in the request;
the one or more non-transitory tangible media further operable for the access point device creating a table entry associating the second insertion slot with the first insertion slot, and responding to the request with identification of the second insertion slot.

18. The one or more non-transitory tangible media of claim 13, wherein the access point device and the successor access point device are attached to distinct parent network devices in a tree-based topology.

* * * * *